(12) United States Patent
Falk et al.

(10) Patent No.: US 10,283,960 B2
(45) Date of Patent: May 7, 2019

(54) AVOIDING AN OVERLOAD FOR TRANSMISSION LINKS WITHIN A POWER SUPPLY SYSTEM

(71) Applicant: SIEMENS AKTIENGESELLSCHAFT, Munich (DE)

(72) Inventors: Rainer Falk, Poing (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 807 days.

(21) Appl. No.: 14/411,685

(22) PCT Filed: Apr. 24, 2013

(86) PCT No.: PCT/EP2013/058520
§ 371 (c)(1),
(2) Date: Dec. 29, 2014

(87) PCT Pub. No.: WO2014/000906
PCT Pub. Date: Jan. 3, 2014

(65) Prior Publication Data
US 2015/0155709 A1   Jun. 4, 2015

(30) Foreign Application Priority Data
Jun. 28, 2012 (DE) .................. 10 2012 211 149

(51) Int. Cl.
*H02J 3/00* (2006.01)
*H02J 3/24* (2006.01)

(52) U.S. Cl.
CPC .................. *H02J 3/00* (2013.01); *H02J 3/24* (2013.01); *Y10T 307/406* (2015.04)

(58) Field of Classification Search
USPC ........................................................ 700/292
See application file for complete search history.

(56) References Cited

U.S. PATENT DOCUMENTS

| 5,521,838 A * | 5/1996 | Rosendahl | H02J 3/14 |
| | | | 307/35 |
| 7,373,222 B1 * | 5/2008 | Wright | H02J 3/14 |
| | | | 700/20 |
| 8,457,801 B2 | 6/2013 | Currie et al. | |
| 2008/0231114 A1 | 9/2008 | Tolnar et al. | |

(Continued)

FOREIGN PATENT DOCUMENTS

| CN | 101689277 A | 3/2010 |
| CN | 101855807 A | 10/2010 |

(Continued)

OTHER PUBLICATIONS

International Stardard: "Communication Networks and Systems in Substations"; First edition, Mar. 2004, Switzerland.

(Continued)

*Primary Examiner* — Hal Kaplan
*Assistant Examiner* — Xuan Ly
(74) *Attorney, Agent, or Firm* — Laurence Greenberg; Werner Stemer; Ralph Locher

(57) ABSTRACT

A method and a regulating unit for avoiding overloads for link sections within a power supply system use requirements for loads to determine which link sections can be enabled for loads.

16 Claims, 2 Drawing Sheets

(56) References Cited

U.S. PATENT DOCUMENTS

2010/0237695 A1* 9/2010 Covaro ................. H04B 3/548
                                                                 307/19
2011/0071699 A1   3/2011 Kim et al.
2011/0298285 A1* 12/2011 Lim ..................... H02J 3/14
                                                                 307/41

FOREIGN PATENT DOCUMENTS

| DE | 102009058878 A1 | 6/2011 |
| GB | 2460504 A | 12/2009 |
| RU | 2259022 C1 | 8/2005 |
| RU | 2277280 C1 | 5/2006 |

OTHER PUBLICATIONS

Cooper et al: "Internet X.509 Public Key Infrastructure Certificate and Certificate Revocation List (CRL) Profile"; http://tools.ietf.org/pdf/rfc5280.pdf.od.

CIM: "Common Information Model, IEC—International Electrotechnical Commission Standard", Dec. 2003.

\* cited by examiner

AVOIDING AN OVERLOAD FOR TRANSMISSION LINKS WITHIN A POWER SUPPLY SYSTEM

BACKGROUND OF THE INVENTION

Field of the Invention

Avoiding an overload for transmission links within a power supply system

The invention relates to a method and to a device for avoiding an overload for transmission links within power supply systems.

Power supply systems for distributing electrical power to a multiplicity of power loads, in particular in a domestic power system or industrial power system, must not be overloaded since as a result damage can occur to the transmission links and/or power loads, such as, for example destruction by fire.

When a plurality of devices with a high switch-on current (for example a plurality of servers in a computing center) are connected it is known from the prior art to supply currents to the individual electrical loads again with staggered timing after a power cut.

In the case of high-voltage lines it is known to measure the temperature of the power lines and to transmit a maximum strength of current as a function thereof. As a result, under favorable temperature conditions power lines can be loaded more strongly than when there is a configuration for the most unfavorable case. From the prior art it is also known to describe data models for electrical power loads or power control devices (CIM—Common Information Model, IEC—International Electrotechnical Commission 61960).

The SCL (Substation Configuration Description Language, IEC 61850-6) is also known. With the latter it is possible, for example, to configure protection devices in a substation (transform station) and therefore also receive the necessary information on the permitted load on lines.

Monitoring a data throughput rate for communication systems is known from the field of telecommunications.

When a limiting value of a maximum transmissible power on link sections within power supply systems is exceeded, fuses are usually triggered and they interrupt the power supply to the entire system. Electrical connection sockets, for example for connecting a washing machine and a dryer to an individual power socket, are also known. In order to prevent an overload, the dryer is deactivated for several minutes if the flow of current to the washing machine exceeds a threshold (for example during heating). As a result, an overload of the socket and triggering of the fuse are prevented.

BRIEF SUMMARY OF THE INVENTION

The object of the present invention is therefore to make available a method and a device which easily prevent an overload of a power supply system.

This object is achieved by means of a method and a device according to the features specified in the independent claims. Advantageous refinements are specified in the dependent claims.

According to the invention, a method for avoiding overloading a link section or a plurality of link sections for the transmission of electrical power to loads within a power supply system has the following steps: firstly, requested power values of electrical power which were requested by loads are determined. A maximum available power value of electrical power is determined for at least one link section. If a requested power value for a link section is less than or equal to the maximum available power value, the link section is then released.

In this way it is ensured that a link section of a power supply system is not overloaded and at the same time a load can draw power if this avoids triggering overloading of the system.

In this context, partial sections of the transmission system are referred to as link sections, said partial sections being characterized, for example, by different strong maximum capacity utilization rates or by a different number of loads which use the link sections. In addition, parallel sections can be present within the system and can be used alternatively.

According to one advantageous refinement, the requested power value is requested as electrical power or strength of current or quantity of current. The specification as electrical power facilitates the determination of the maximum available power value since the capacity utilization rate of a link section is determined by the electrical power, that is to say the electrical power per time unit, and therefore no further conversion is necessary. Given a known voltage of a load, which could be, in particular, a domestic appliance, the specification of the requested power value as a unit of current is sufficient. In addition, appliances which are commercially available for implementing the invention operate on the basis of current or power, with the result that a cost-effective implementation of the invention is possible.

In a further refinement of the method, the requested power value is embodied as a power profile which requests power values which are variable over time. This particularly advantageously optimizes the way of taking into account loads which in fact require power in a very variable fashion over time or require power values which fluctuate over time. For periods in which, for example, a load does not require any power, the requesting of the load is correspondingly taken into account for the determination of the maximum available power value on a link section, in that a power value is not reserved for it. In this way, a capacity utilization rate of a link section can be increased.

According to an advantageous refinement, the requested power value is determined by means of a regulating unit. A regulating unit which is embodied in a separate fashion provides, in particular, the advantage that the method can be easily implemented in already existing power supply systems.

According to one further advantageous refinement, the at least one load is authenticated by means of the regulating unit in order to ensure that only loads which are requested to extract power are taken into account in the determination of the maximum available power value.

According to a further advantageous refinement, at least two link sections are used for at least two loads. It is therefore possible, for example, to ensure an optimum capacity utilization rate of the power supply system by means of alternative link sections.

According to a further advantageous refinement, in order to determine the maximum available power value per link section, the at least one requested power value is subtracted from a predefinable power value of the link section. A predefinable power value may be, for example, the value which constitutes the maximum possible capacity utilization rate of the link section or a relatively low value in order to rule out, for example, a buffer area continuously from the release of loads.

In this way, the maximum available power value per link section is easily determined.

According to a further advantageous refinement, the release is prevented if the requested power value of the at least one load exceeds the maximum available power value.

This prevents a load which would lead to an overload of the power system if it were to draw the power requested by it, for example, from being able to use the link section. This is advantageous for the other loads which as a result of the prevented release are not affected by the consequences of a power failure, and for the load for which no release is produced, it is likewise not disadvantageous since it would be affected by a power failure in any case.

In another refinement, the release of the link section for a load is carried out as a result of the fact that authorization, which is encoded as an authorization token, is issued. This involves, for example, the Security Assertions Markup Language (SAML) token which constitutes, on the basis of Extensible Markup Language (XML) data structures for the load a way of proving authentication, for example using cryptographic key material. This provides a high level of security when checking requirements. In addition, authentication of the load, for example in the form of a device, by means of a certificate is advantageous, for example if the authorization token is embodied as an attribute certificate which is tied to a device certificate. It is therefore possible to issue authorization solely on the basis of authentication of the requesting device.

Furthermore, it is possible to assign, by means of an attribute certificate, an authorization token, in which it is chronologically limited in other ways, as the device certificate. This permits, for example, only brief additional consumption to be authorized.

One refinement of the method in which the release takes place for a predefinable time period has, in particular, the advantage that authorization for a time period of any desired length, for example over several months, can be issued for a load. At the same time, it is, however, also possible to control the blocking of a load and, for example, a release can be issued on the standard basis for a limited time period, for example several hours.

According to a further refinement, a value of electrical power which is actually drawn by the load is determined. This control guarantees that the load does not draw a larger value than the power value released for it. The load receives a message if the value exceeds the value released for it. The power supply system can for this purpose obtain a buffer which is not released via requests but instead is reserved for occasions when the released value is exceeded.

Therefore, on the one hand for the load which exceeds the released power value there is the possibility of adapting the value of the electrical power drawn by it. On the other hand, undesired consequences of the value being exceeded, such as the release of a fuse by the overloading of the power system, do not occur.

In one advantageous refinement, the message is displayed in the form that the load is disconnected from the power supply system NET. In this case, the load requests again a power value from the start, and if appropriate, one or more link sections are released again. This prevents the released power value from being exceeded, and the other loads of the power system are not affected by possible consequences such as the release of a fuse.

According to a further aspect of the invention, a device is provided for avoiding overloading at least one link section, wherein the at least one link section is configured to transmit electrical power within a power supply system for at least one load, comprising a first unit for determining a requested power value of electrical power of the at least one load, a second unit for determining a maximum available power value of electrical power for the at least one link section, and a third unit for releasing the at least one link section to the at least one load for the transmission of the requested power value if the requested power value does not exceed the maximum available power value.

In one advantageous refinement, the third unit M3 is an authorization server which distributes an authorization token or a protocol which contains the authorization information.

BRIEF DESCRIPTION OF THE SEVERAL VIEWS OF THE DRAWING

The invention will be explained in more detail below with an exemplary embodiment on the basis of the figures, in which.

DESCRIPTION OF THE INVENTION

Figure 1:
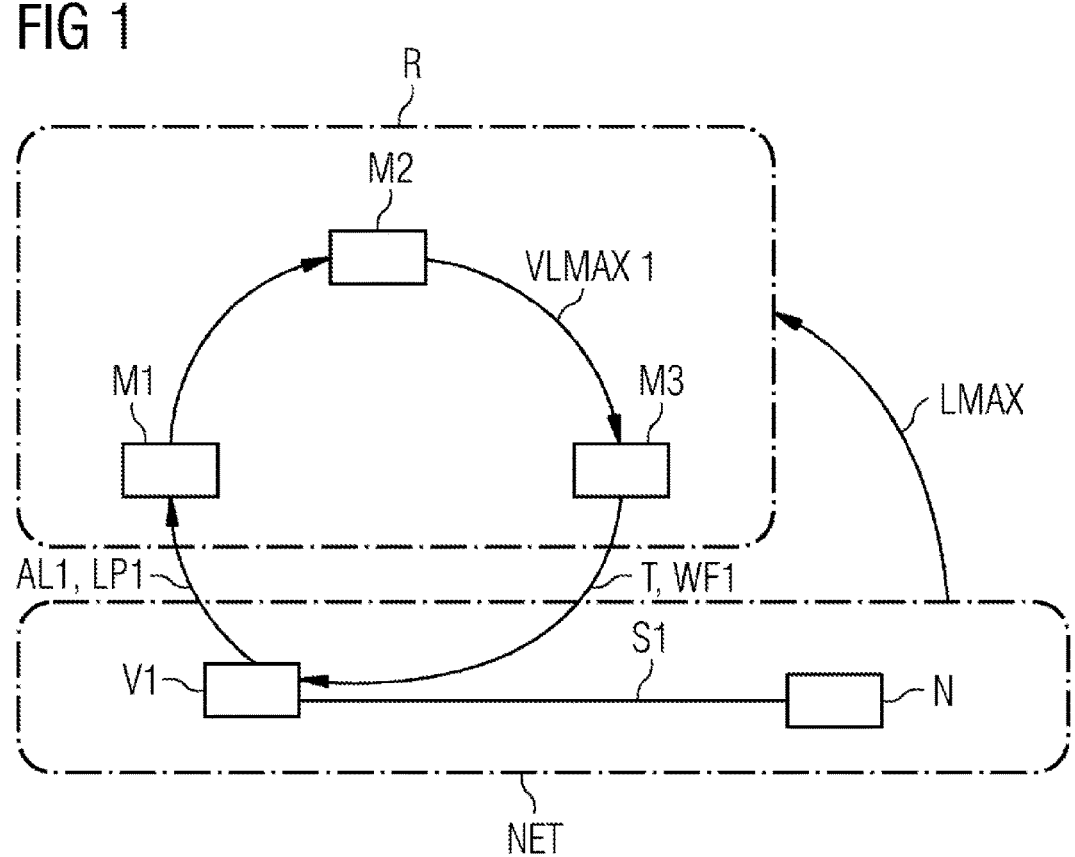
FIG. 1 shows a schematic illustration of a power supply system according to an exemplary embodiment of the invention.

FIG. 1 shows in a first example of the invention a power supply system NET having a power distribution station N, a load V1 and a link section S1. The power distribution station is a diesel generator which transmits 400 V (V—volt) direct current via the link section, wherein the link section at 400 V can transmit a current of at maximum 50 A (A—ampere), and the load is a battery of an electric vehicle which needs to be charged.

In a first step, a requested power value AL1 of electrical power of the load is determined using a first unit M1. The requested power value AL1 is configured as a power profile LP1, wherein the power profile makes the following request over time:

| Time period | requested power value as maximum requested current in ampere A at 100 V direct current |
|---|---|
| 0-60 min | 100 A |
| 60-120 min | 80 A |
| 120-360 min | 40 A |

In a second step, a maximum available power value VLMAX1 of electrical power of the link section is determined using a second unit M2.

In a first example, merely a single load is observed, with the result that only the load has to be taken into account during the determination. The maximum available power value can be calculated as follows:

$$VLMAX1 = 400\ V * 50\ A = 20\ kW$$

The electric vehicle requires, by means of the requested power value, at maximum:

$$AL1 = 100\ V * 100\ A = 10\ kW$$

By means of a third unit M3, in a third step the link section is released to a load for the transmission of a released value WF1 which corresponds to the requested power value if the requested power value is less than or equal to the maximum available power value. In this example, the requested power value AL1 is less than the maximum available power value of the link section VLMAX1, i.e. VLMAX1>AL1. The released value is therefore as follows WF1=AL1=10 kW. This means that the electric vehicle can consume a power of 10 kW.

In order to be able to utilize the capacity of the link section as efficiently as possible, the electric vehicle receives the released value WF1=10 kW only for 60 min, as requested in the power profile. After that, the released value WF1 is reduced to WF1=100 V*80 A=8 kW for the following 60 min. Finally, the value is reduced further to WF1=100 V*40 A=4 kW for the time period of 120 min up to 360 min. After the 360 min, the release is cancelled completely. If the electric vehicle then continues to require electrical power, it has to communicate the requested power value to the first unit again.

The invention has been illustrated in the first example on the basis of direct current. Of course, power values can also be given for alternating current or a combination of direct current and alternating current. In addition, adaptation of voltage values and frequencies can be carried out as desired, for example as in the first example a transformation of 400 V to 100 V direct current.

The release can be implemented, for example, within a domestic system by a domestic control device (energy gateway) which assigns the authorizations to the individual loads, i.e. devices of the domestic system. An energy gateway can then, for example, switch off loads if a device consumes a power value which exceeds the released value.

Mobile devices which are not continuously connected to the domestic system can receive an authorization token T via an authorization server and can transmit their authorization information via a communication connection (for example a LAN connection or a WLAN connection) to the energy gateway, with the result that the energy gateway can react dynamically to changes in the distribution of the authorizations.

Figure 2:
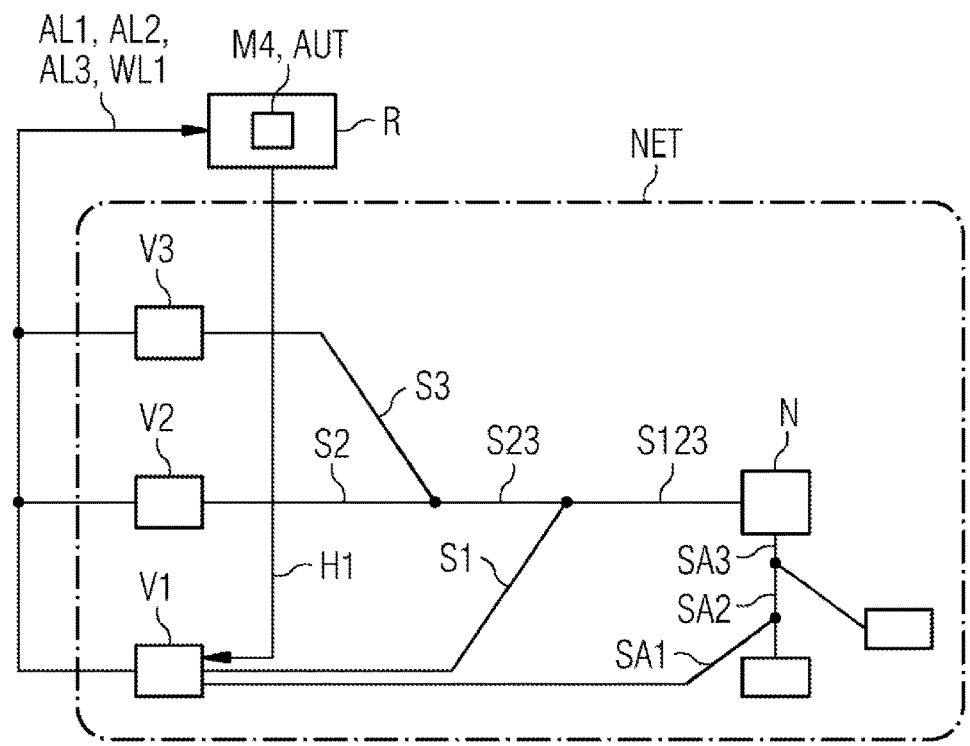
FIG. 2 shows a schematic illustration of a power supply system according to a further exemplary embodiment of the invention.

On the basis of FIG. 1 and FIG. 2, an exemplary embodiment within the field of an industrial power system will be presented below. A first load V1, a second load V2 and a third load V3 are shown, said loads using a first link section S1, a second link section S2, a third link section S3, a fourth link section S23 and a fifth link section S123 of a power supply system NET. In this context, for example the first load uses the first link section alone, and likewise the second load uses the second link section alone and the third load uses the third link section alone. The fourth link section is used commonly by the second load and third load, and the fifth link section is used commonly by the first load, the second load and third load.

In order to determine a maximum available power value VLMAX1 for the first load on the first link section S1 and the fifth link section S123, a second power value AL2 which is requested by the second load on the first link section S1 and on the fifth link section S123, and the third power value AL3 which is requested by the third load are subtracted from a predefined power value LMAX.

A regulating unit R is implemented as hardware with software which is matched thereto. The regulating unit knows the predefined power value which in this example is fixed and identical for all the lines and constitutes the maximum possible load on the lines which are used for transmitting power.

A first unit M1 is a software component of the regulating unit in order to receive requested power values. The reception is carried out by means of wireless or wire-bound network connections within the power supply system NET.

This step which is implemented by the first unit is stored as program code on a memory medium of the regulating unit, wherein instructions of the program code are processed by at least one computing unit on the regulating unit.

For the first link section, a second or third power value is not requested either by the second or third load: in this case, the first link section is released for the first load if the first requested power value is less than or equal to the predefined power value.

For the fifth link section, second and third power values requested by the second and third loads are subtracted from the predefined power value. If the remaining value is greater than or equal to the value requested by the first load, the fifth link section is released for the first load.

A second unit M2 is responsible for the determination of the maximum available power value as described here, said second unit executing, like the first unit, the instructions of a program code, that is to say essentially the subtraction of the power values.

A load can draw power if all the link sections which the load requires to draw the power are released. The link may be a link within the power system which does not correspond to the shortest or closest link, this would be, for example, those with the fewest nodes, i.e. link sections. If there are alternative link sections for a load, the regulating unit firstly evaluates the case of the shortest link and then evaluates the alternative link sections if a requested power value has not already been released for the shortest link. In the case shown in FIG. 2, the load can therefore receive a release for a first alternative link section SA1, a second alternative link section SA2 and a third alternative link section SA3, if the first and fifth link sections have not been released.

In the example described here, the second load requests a power value in the form of a power profile with power values which are variable over time. The maximum available power value is determined per individual time units which are predefined by the time units of the power profile. It is therefore possible to take into account that the second load requires power at regular intervals. Particularly in an automation system the requesting by loads in the form of devices such as robots is predefined in accordance with specific process sequences which regulate the use of the robot. The corresponding link sections are therefore not unnecessarily allocated during the periods in which devices do not need power, wherein at the same time the power supply to a device is ensured for a point of time in the future. This is advantageous particularly in the case of safety-relevant process steps for which a device has to be able to reliably draw power.

The regulating unit also determines the most favorable variant in a plurality of alternative link sections for a load in order to be able to supply power to as many loads as possible:

If a requested power value from the second load is present on the regulating unit for a time unit in the future, the relating unit can take this into account in the determination of the maximum available power value for the first load which requests a power value for a time unit which is earlier in time, and can release a link for the first load, with the result that the power supply of the second load is also ensured at the same time. This may be achieved, for example, in that the three alternative link sections are released for the first load, said link sections not being required to ensure the power supply of the second load.

The regulating unit also comprises a third unit M3, inter alia for authenticating (AUT) loads. After successful authentication, a load received an identity certificate.

In the case of a release, the third unit also issues the authorization. This is done in the exemplary embodiment by expanding the identity certificate with an authorization certificate.

The third unit serves as a certification point and therefore processes data structures and program codes in order to carry out the authentication and to issue certificates in accordance with the requested power profiles.

Figure 3:
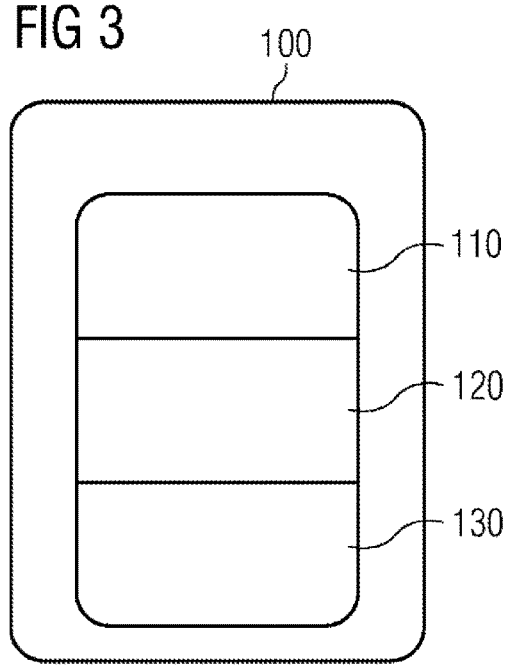
FIG. 3 shows a schematic illustration of a data structure for issuing certificates according to a further exemplary embodiment of the invention.

FIG. 3 shows in this respect a data structure 100 which describes the structure of a certificate, composed of a general definition region 110, an identity region 120 and an authorization region 130. Said certificates are known by the standard X.509 (Request for Comment (RFC) S280).

The general definition region 110 defines general data of the certificate. These are, inter alia, a serial number of the certificate and an issuer of the certificate in order to characterize the origin of the certificate and the validity of the certificate.

The data structure also contains an identity region 120 which defines data relating to a specific identity for which the certificate was issued. Here, a name of an owner of the identity certificate can be defined for the unambiguous assignment of certificates to loads.

In the case of a release of a link, the data structure additionally contains an authorization region 130 which contains information about a released value WF1, the released link sections, the period for which the release takes place, and a priority with which a load is weighed. In the case of two authorization certificates being present, the priority regulates the sequence of the release of link sections to loads, wherein during the determination of the maximum available power value a load with the certificate which has the higher priority is initially taken into account.

In the case of a release, the information relating to how the release has sent a load in a request is stored here.

The authorization region can alternatively also be a separate certificate (attribute certificate) which is assigned to an identity certificate.

After the submission of this data structure by a load at a power distribution station N, the link sections are released, and a load can draw power via the released link sections.

In addition, the regulating unit determines a value WL1 of the power which is actually drawn by the first load. This value is compared with the released value defined in the certificate. In this way, in the scenario of the industrial power system it is possible to detect that a load draws more power than was released to it, and a message H1 can be transmitted to the first load. In this way, the load can adjust the value of the power drawn by it. Particularly in industrial power systems, where it can be assumed that overshooting takes place unintentionally, a device is prevented from being disconnected from the power supply, which possibly avoids a situation in which the process step cannot be carried out.

The regulating unit R as well as the first unit M1, second unit M2 and third unit M3 can be implemented and embodied using software, hardware or a combination of software and hardware.

In this way, the steps which are implemented by means of the specified units of the device can be stored as program code on a memory medium, in particular a hard disk, CD-ROM or a memory module, wherein the individual instructions of the program code are read out and processed by at least one computing unit, comprising a processor. The processor is connected to the memory medium via a bus for exchanging data.

In addition, an input/output unit can be connected via the bus, wherein data can be received and/or transmitted by means of the input/output unit.

In addition, the units can also be implemented and embodied in a distributed fashion over a plurality of computing units.

The invention claimed is:

1. A method for avoiding overloading of at least one link section configured to transmit electrical power within a power supply system for at least one load, the method comprising the following steps:
   determining a requested power value of electrical power of the at least one load;
   determining a maximum available power value of electrical power for the at least one link section, wherein the maximum available power value is dependent on a maximum load that can be placed on the at least one link section due to a power transmission capacity of the at least one link section; and
   releasing the at least one link section to the at least one load for a transmission of a released value corresponding to the requested power value if the requested power value is less than or equal to the maximum available power value.

2. The method according to claim 1, which further comprises requesting the requested power value as electrical power or strength of current or quantity of current.

3. The method according to claim 1, which further comprises configuring the requested power value as a power profile requesting power values being variable over time.

4. The method according to claim 1, which further comprises determining the requested power value by using a regulating unit.

5. The method according to claim 4, which further comprises authenticating the at least one load by using the regulating unit in order to determine the requested power value.

6. The method according to claim 1, which further comprises providing at least two link sections for at least two loads.

7. The method according to claim 6, which further comprises subtracting the at least one requested power value from a predefined power value of the link section in order to determine the maximum available power value per link section, wherein the predefined power value of the link section is the maximum possible load that can be placed on the at least one link section.

8. The method according to claim 1, which further comprises preventing the release if the requested power value of the at least one load exceeds the maximum available power value.

9. The method according to claim 1, which further comprises carrying out the release by issuing authorization being encoded as an authorization token.

10. The method according to claim 9, wherein the token is a certificate.

11. The method according to claim 1, which further comprises carrying out the release for a pre definable time period.

12. The method according to claim 1, which further comprises determining a value of a drawn electrical power of the at least one load, and receiving a message at the at least one load if the value exceeds the value released for it.

13. The method according to claim 12, which further comprises providing the message in the form of a disconnection of the at least one load from the power supply system.

14. A regulating unit for avoiding overloading of at least one link section configured to transmit electrical power within a power supply system for at least one load, the regulating unit comprising:
- a first unit configured to determine a requested power value of electrical power of the at least one load;
- a second unit configured to determine a maximum available power value of electrical power for the at least one link section, wherein the maximum available power value is dependent on a maximum load that can be placed on the at least one link section due to a power transmission capacity of the at least one link section; and
- a third unit configured to release the at least one link section to the at least one load for a transmission of the requested power value if the requested power value does not exceed the maximum available power value.

15. The regulating unit according to claim 14, which further comprises at least one fourth unit configured to:
- determine the requested power value of electrical power of the at least one load;
- determining the maximum available power value of electrical power for the at least one link section; or
- release the at least one link section to the at least one load for a transmission of a released value corresponding to the requested power value if the requested power value is less than or equal to the maximum available power value.

16. The method according to claim 1, wherein the maximum available power value is the maximum possible load on lines for transmitting power.

* * * * *